K. O. MUEHLBERG.
HOSE CONNECTION.
APPLICATION FILED FEB. 1, 1915.
1,172,299.
Patented Feb. 22, 1916.
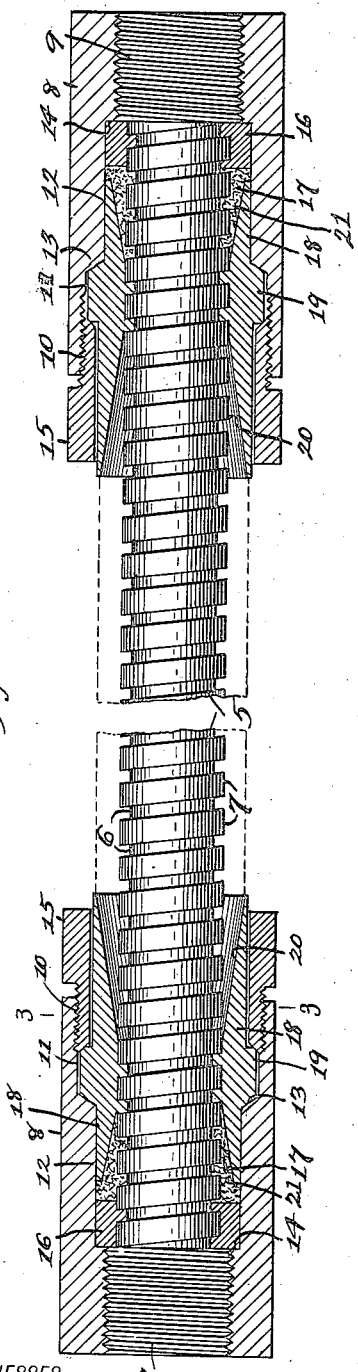
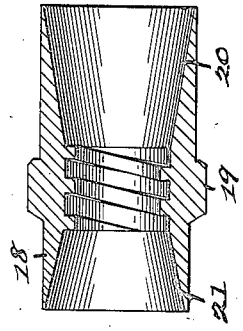
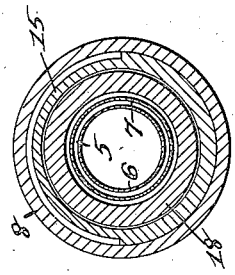
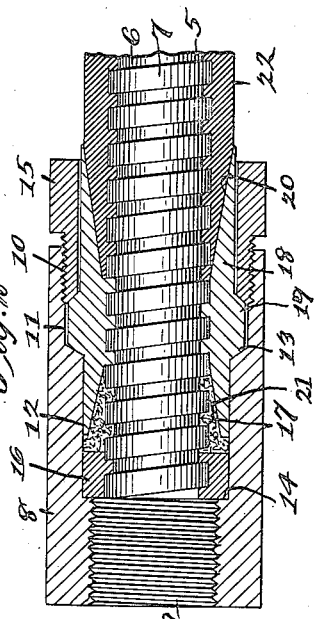
WITNESSES
F. D. Sweet
J. C. Larsen
INVENTOR
Karl O. Muehlberg
BY
ATTORNEYS

UNITED STATES PATENT OFFICE.

KARL O. MUEHLBERG, OF MANITOWOC, WISCONSIN, ASSIGNOR OF FORTY-EIGHT ONE-HUNDREDTHS TO J. PETER EASTMAN, OF MANITOWOC, WISCONSIN.

HOSE CONNECTION.

1,172,299.  Specification of Letters Patent.  Patented Feb. 22, 1916.

Application filed February 1, 1915.  Serial No. 5,441.

*To all whom it may concern:*

Be it known that I, KARL O. MUEHLBERG, a citizen of the United States, and a resident of Manitowoc, in the county of Manitowoc and State of Wisconsin, have invented certain new and useful Improvements in Hose Connections, of which the following is a specification.

My invention relates to means for connecting gas, water, or other hose cocks, stoves, or other devices, and one of the main objects thereof is to provide such connections which are positively proof against leakage.

A further object is to adapt the connection to metallic, flexible, hose, and in such manner as to form a component part thereof, although readily removable therefrom; and further objects are to adapt the said connections to covered or uncovered hose, to form the same of few parts not likely to get out of order to require repair, and to provide such connections which are simple in construction and installation, and comparatively inexpensive.

My invention is fully described in the following specification, of which the accompanying drawings form a part, in which like reference characters refer to like parts in each of the views, and in which:—

Figure 1 is a side view of a section of uncovered metallic hose provided with my connection at each end thereof, and said connections being shown in section; Fig. 2 is a similar view of one of the connections as applied to covered hose; Fig. 3 is a section taken on the line 3—3 of Fig. 1; and Fig. 4 is a detached, sectional, view of one of the members of my connection.

In the drawings forming a part of this application I have shown at 5, Fig. 1, a section of uncovered, flexible, metallic, hose formed of metal strips helically wound upon each other, an inner strip 6 having an outer strip 7 wound thereon, suitable packing being provided between the strips, this being a well known form of hose, and forms no part of my invention except in so far as a spiral thread is formed on the outer surface of the hose.

My invention consists of a coupling 8 having an internally threaded bore 9 for connection with a cock, faucet, or other article, and having an enlarged, internally threaded, bore 10 at its other end and two cylindrical bores 11 and 12 stepped down from the bore 10 to the bore 9 to form shoulders 13 and 14, and I provide a cylindrical gland 15 adapted to be screwed into the bore 10, and the inner end of which gland is inwardly tapered, as clearly shown in Figs. 1 and 2.

At the extreme end of the hose 5 I provide a nut 16 which has an internal thread conforming to the helical winding of the hose strip 7, and adapted to be screwed onto the hose to provide a seat for a packing 17 of any suitable material, said nut being of a diameter approximating that of the bore 12 of the coupling 8.

Similarly threaded on the hose is a sleeve 18 having a flange 19 thereon the diameter of which approximates that of the bore 11 of the coupling, one edge of said flange being preferably tapered to conform to the taper in the end of the gland 15; the interior of the ends of the sleeve 18 is outwardly flared as shown at 20 and 21, whereby only a relatively short length of the sleeve is in threaded engagement with the hose 5, but enough to maintain a firm engagement therewith.

In practice, I first screw the sleeve 18 onto the hose to a point beyond what will be its locking position, after which the nut 16 is screwed on the hose with the packing 17 between the sleeve and nut; the sleeve 18 is then screwed toward the nut to bind the packing between itself and the nut, the hose with its present connections then being introduced into the coupling, and the gland 15 then being placed in position and screwed tightly into place, thereby forcing the sleeve flange 19 against the shoulder 13 and the nut 16 against the shoulder 14, either or both of which may bear against the respective shoulders. The coupling 8 is now firmly locked to the hose, and a non-leakable joint is formed therebetween because of the packing 17. The above method is followed also where the hose is covered, as by a rubber sheathing 22, Fig. 2, but I strip the covering for a suitable distance from the end of the hose to clear the metallic windings, and then taper the end of the covering whereby the sleeve 18 may be screwed firmly over the tapered covering, and thus produce a tight and neat joint.

The hose, with its connected parts, may be quickly and easily detached from the coupling 8, whenever desired, and the arrangement at the hose engaging end of the coupling may be duplicated at the other end in order to provide a coupling for two hose lengths, or I may form the free end of said coupling in any desired manner to adapt the same for connection with any desired pipe, cock, faucet, or the like, according to the use to which the hose and connections are put.

It will thus be seen that I provide a tight connection between a hose and a coupling which avoids the necessity for soldering, which may be readily detached for any reason, which may be used over and over with different hose lengths and with different couplings, which is simple in construction and installation, and which is comparatively inexpensive.

I may also vary the details of construction shown and described, within the scope of the following claim, without departing from the spirit of my invention or sacrificing its advantages.

Having fully described my invention, what I claim as new, and desire to secure by Letters Patent, is:—

The combination with a metallic hose formed of helically wound strips; of a coupling provided with two shoulders therein, a sleeve threaded on said hose and provided with an external flange, a nut threaded on the end of said hose, packing locked between said sleeve and nut, and a gland threaded into said coupling and bearing on said flange to force the same against one of said shoulders to lock said parts together, the other of said shoulders serving as a bearing for said nut.

In testimony whereof I have signed my name to this specification in the presence of two subscribing witnesses.

KARL O. MUEHLBERG.

Witnesses:
  J. PETER EASTMAN,
  JESSIE MARION RHODE.